United States Patent
Duvall et al.

(10) Patent No.: US 6,182,200 B1
(45) Date of Patent: Jan. 30, 2001

(54) DENSE EDIT RE-RECORDING TO REDUCE FILE FRAGMENTATION

(75) Inventors: Roger Mather Duvall, Garden Grove; Jeffrey Mark Claar, Aliso Viejo, both of CA (US)

(73) Assignees: Sony Corporation, Tokyo (JP); Sony Electronics, Inc., Park Ridge, NJ (US)

(*) Notice: Under 35 U.S.C. 154(b), the term of this patent shall be extended for 0 days.

(21) Appl. No.: 09/470,702

(22) Filed: Dec. 23, 1999

Related U.S. Application Data

(63) Continuation-in-part of application No. 08/935,478, filed on Sep. 24, 1997, now Pat. No. 6,047,360.

(51) Int. Cl.⁷ .................................................. G06F 12/02
(52) U.S. Cl. .............................. 711/165; 711/4; 711/171; 704/278; 707/206; 709/102; 710/6; 710/24; 710/30; 710/52
(58) Field of Search ........................ 711/105, 165, 711/171, 4; 704/278; 707/206; 709/102; 710/6, 52, 24, 30

(56) References Cited

U.S. PATENT DOCUMENTS

| | | | |
|---|---|---|---|
| 4,868,687 | * | 9/1989 | Penn et al. .................. 360/13 |
| 5,560,003 | * | 9/1996 | Nilsen et al. ................ 707/206 |
| 5,574,907 | * | 11/1996 | Iv et al. ..................... 707/1 |
| 5,740,395 | * | 4/1998 | Wells et al. ................. 711/103 |
| 5,751,672 | * | 5/1998 | Yankowski ................... 369/30 |
| 5,808,821 | * | 9/1998 | Davy ........................ 360/48 |
| 5,829,050 | * | 10/1998 | Maeda ...................... 711/171 |
| 6,070,172 | * | 5/2000 | Lowe ....................... 707/205 |

\* cited by examiner

*Primary Examiner*—Hiep T. Nguyen
(74) *Attorney, Agent, or Firm*—Blakely, Sokoloff, Taylor & Zafman LLP

(57) ABSTRACT

The present invention is a method and apparatus for re-recording audio events. Scattered audio events on a first track are determined based on a linked list. The scattered audio events are merged into a combined audio event on a second track. The combined audio event is copied on the second track to the first track.

18 Claims, 5 Drawing Sheets

DENSE EDIT RE-RECORDING TO REDUCE FILE FRAGMENTATION

CROSS-REFERENCES TO RELATED APPLICATIONS

This is a Continuation-in-Part of U.S. patent application Ser. No. 08/935,478 which was filed Sep. 24, 1997 now U.S. Pat. No. 6,047,360 and is owned by Assignee of the present Application.

BACKGROUND

1. Field of the Invention

The present invention is related to recording. In particular, the present invention is related to dense edit re-recording.

2. Description of Related Art

During editing, a track of audio may consist of a few large or many small sequential audio segments (events). These sequential sections are stored onto recording media, e.g., hard disk, in a random order depending on the particular file allocation at the time. When there are many small sequential edited segments, these segments are scattered over the entire disk. During playback, the seek time for these scattered sections increases because of their random location on the disk. The system therefore cannot provide real-time audio during playback.

There are several conventional approaches to the above problem. One approach is merely not to play audio if disk access cannot be completed. This approach leads to random drop-outs in the audio, resulting in unacceptable quality. Another approach is to limit the size of the sections during edit so that small edits will never occur. This approach severely limits the usability of the system. A third approach is to re-record the affected area to combine the small events into one recording. This approach requires a real-time copy of the audio, leading to unacceptable delays in the recording process.

Accordingly, there is a need in the technology to provide an efficient dense edit to reduce playback file access time.

SUMMARY

The present invention is a method and apparatus for re-recording audio events. Scattered audio events on a first track are determined based on a linked list. The scattered audio events are merged into a combined audio event on a second track. The combined audio event is copied on the second track to the first track.

BRIEF DESCRIPTION OF THE DRAWINGS

The features and advantages of the present invention will become apparent from the following detailed description of the present invention in which.

DESCRIPTION

The present invention is a method and apparatus to re-record audio events. Scattered audio events on a first track are determined based on a linked list. The scattered audio events are merged into a combined audio event on a second track. The combined audio event is copied on the second track to the first track.

In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown where unnecessary for an understanding of the present invention. For example, specific details are not provided as to whether the method is implemented in a station as a software routine, hardware circuit, firmware, or a combination thereof.

Embodiments of the invention may be represented as a software product having program code segments to perform the necessary tasks corresponding to the elements of the present invention. The program or code segments can be stored in a processor readable medium or transmitted by a computer data signal embodied in a carrier wave, or a signal modulated by a carrier, over a transmission medium. The processor or machine readable medium may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The processor or machine readable medium may contain various sets of instructions, code sequences, configuration information, or other data. Those of ordinary skill in the art will appreciate that other instructions and operations necessary to implement the described invention may also be stored on the machine-readable medium. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 1:
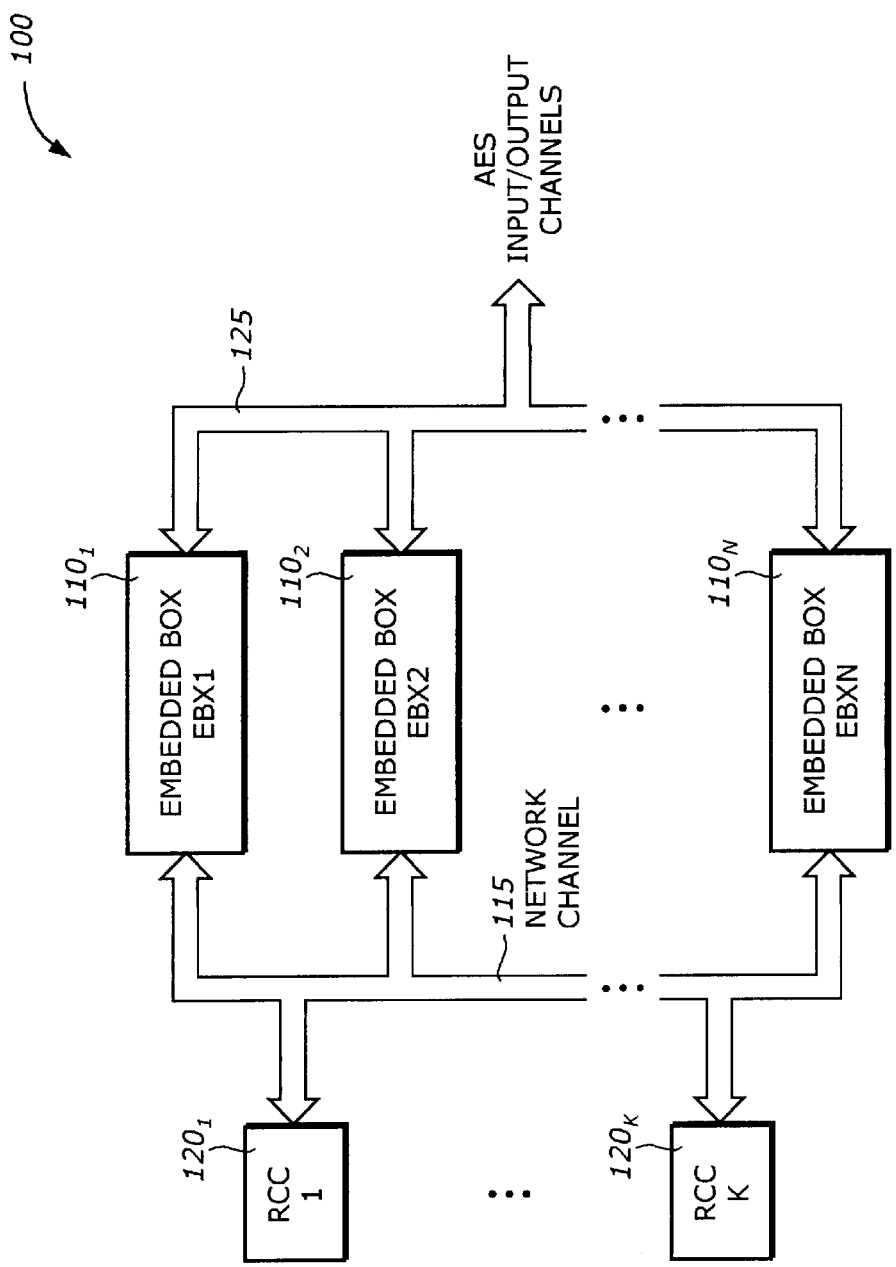
FIG. 1 is a block diagram illustrating an audio system that operates in accordance with the teachings of the present invention.

FIG. 1 is a block diagram illustrating an audio system 100 that operates in accordance with the teachings of the present invention. The system 100 comprises embedded boxes (EBX) EBX1 through EBXN $110_1$ through $110_N$ ("N" being a whole positive number), K remote client computers (RCCs) $120_1$ through $120_K$ ("K" being a positive whole number), network channel 115, audio engineering society (AES) standard input/output channels 125, and synchronizing clock 130.

Each of the EBX $110_1$ through $110_N$ is an audio signal processing system with mass storage. In one embodiment, each EBX consists of a personal computer (PC) system and one or more digital signal processors (DSPs). Other configurations that provide similar functionalities are also contemplated. Audio sampled data are stored in multiple dynamic random access memory (DRAM) banks. These DRAM banks are accessible to both the host processor of the PC and the DSPs. The details of the EBX architecture will be discussed later.

Each of the RCC's $120_1$ through $120_K$ provides graphical user interface (GUI) to users for sending command and control information to the EBXes $110_1$ through $110_N$ over the network channel 115. Each RCC has two modes of communication to the EBXes: individual addressing and broadcasting. In individual addressing, the RCC issues the command/control information to the specified EBX. The individual address of the destination is encoded as part of the command/control information.

The AES I/O channels 125 consist of 16 audio I/O channels per EBX conforming to the AES standard. The standard is AES 3-1992 and is available from the Audio Engineering Society, Inc., located in New York, New York. The synchronizing clock 130 provides a master timing signal for synchronizing all real-time activities of the EBXes $110_1$ through $110_N$.

Figure 2:
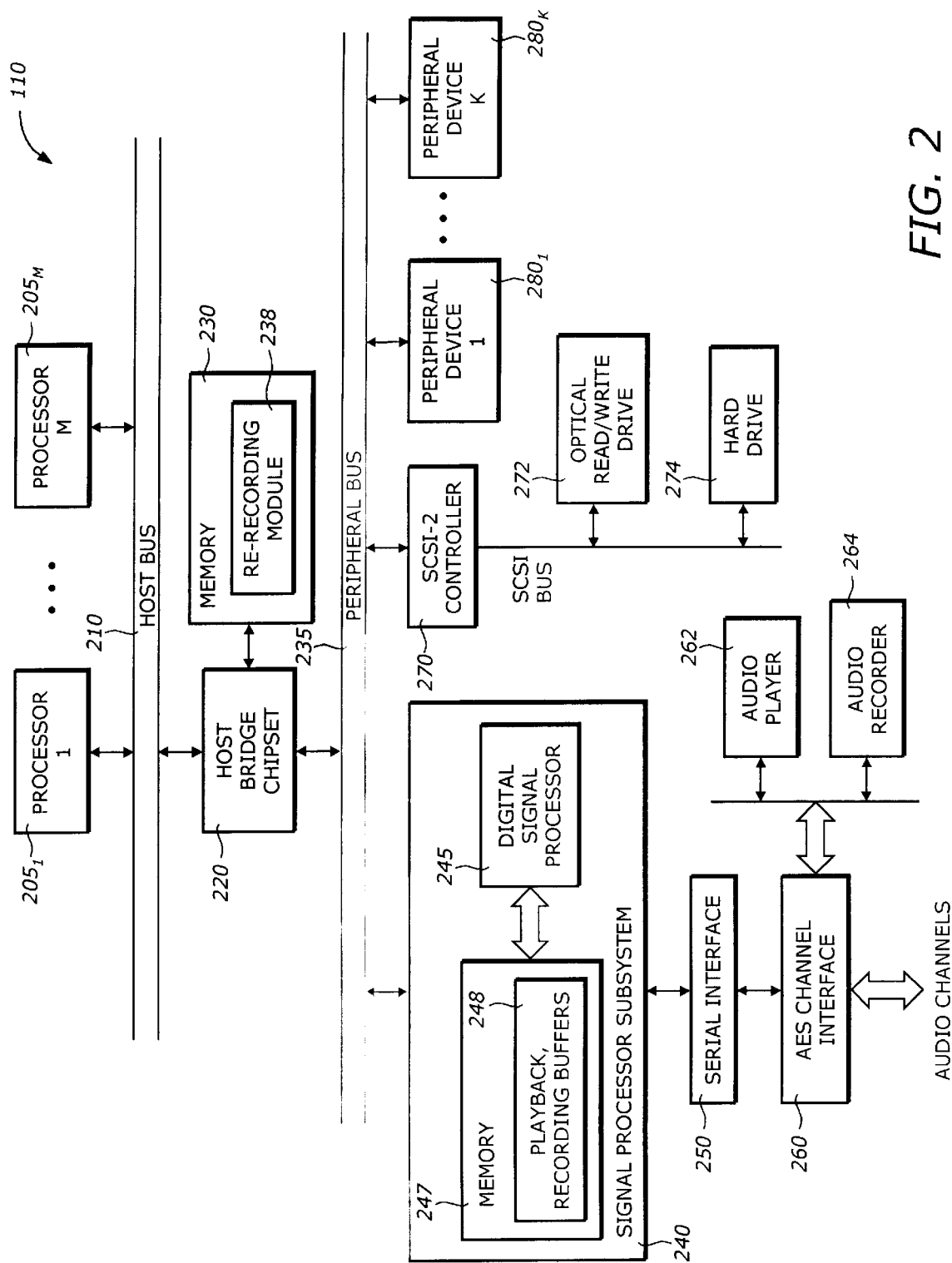
FIG. 2 is a diagram illustrating an embedded box in the audio system according to one embodiment of the present invention.

FIG. 2 is a diagram illustrating an embedded box (EBX) 110 in the audio system according to one embodiment of the present invention. The EBX 110 comprises one or more processors $205_1$–$205_M$ ("M" being a positive whole number), a host bus 210, a host bridge chipset 220, a main memory element 230, a peripheral bus 235, a signal processing subsystem 240, a serial interface 250, an audio interface 260, an audio player 262, an audio recorder 264, a disk controller 270, and K (where "K" is a positive whole number) peripheral devices $280_1$ to $280_K$.

Processors $205_1$–$205_M$ are any microprocessors. In this embodiment, processors $205_1$–$205_N$ are the Pentium® or Pentium Pro® microprocessors manufactured by Intel Corporation at Santa Clara, California. The host bus 210 is a bus that can support transactions to a number of connected processors. Host bus 210 may be referred to as a parallel bus or multiprocessor bus because it supports parallel operations and multiple processors. It is contemplated that host bus 210 operates in a pipelined manner to increase efficiency. However, these features should not be construed to limit the teachings of the present invention. The present invention can be utilized even if there is only one processor connected to the host bus 210, or the host bus 210 is a uni-processor bus.

The host bridge chipset 220 is coupled to the host bus 210 to provide interface between the host processors $205_1$–$205_M$ and the memory 230 and the peripheral bus 235. In general, the chipset 220 operates as an interface between a host bus 210 and a peripheral bus 235. Chipset 220 typically includes cache DRAM controller (CDC), peripheral bus controller, and data path unit (DPU). The Peripheral Component Interconnect (PCI) Bridge (PB) provides a set of host-to-PCI and PCI-to-host bus transaction translations. The memory 230 is the memory accessed by the host processors $205_1$–$205_M$ and other processors coupled to the peripheral bus 235. The memory 230 may include dynamic random access memory (DRAM), static random access memory (SRAM), flash memory, read-only memory (ROM), or any other storage media. The memory 230 includes program code and data for the dense edit, including a re-recording module 238. The re-recording module 238 includes functions, programs, subroutines to perform tasks such as control, communication, play back, recording, and re-recording. The re-recording module 238 may be downloaded from a storage medium or transferred via a communication channel. The re-recording module 238 may contain computer readable program code for determining scattered audio events on a first track based on a linked list, computer readable program code for merging the scattered audio events into a combined audio event on a second track, and computer readable program code for copying the combined audio event on the second track to the first track. In addition, the re-recording module 238 may include computer readable program code for identifying the elements of the linked list having the corresponding sizes less than a predetermined threshold. The computer readable program code for merging the scattered audio events may include computer readable program code for allocating the second track based on the identified elements.

The peripheral bus 235 provides a communication path between the processors $205_1$–$205_M$ or main memory element 230 and a plurality of peripheral devices $280_1$–$280_K$ ("K" being a positive whole number). These peripheral devices $280_1$–$280_K$ may include I/O devices such as disk controller, local area network (LAN) card. The disk controller 270 is a small computer system interface (SCSI)-2 controller which is interfaced to a number of mass storage devices such as optical read/write drive 272 and hard drive 274, through the SCSI-2 bus.

The signal processing subsystem (SPS) 240 includes digital signal processors (DSPs) 245, a memory 247, and other devices such as PCI bus interface circuits. The memory 247 stores program code and data for the dense edit including buffers containing the audio data that has been read from disk or are waiting to be recorded into. The memory 247 may include playback and recording module 248. The playback and recording module 248 may contain computer readable program code for playing back the audio events in the identified elements from the first track, and computer readable program code for recording the played back audio events to the second track to form the combined audio event.

The SPS 240 has interface to the serial input/output communication device 250 which is connected to the AES I/O channel interface 260. The peripheral bus 235 may include a Peripheral Component Interconnect (PCI) bus or any other type of bus architecture.

Other buses may be coupled to the peripheral bus 235 via appropriate chipsets or interface circuits. Examples of these buses include an Industry Standard Architecture (ISA) bus or an Extended Industry Standard Architecture (EISA) bus.

During recording, the EBX 110 write the audio data from the AES audio channels on a mass storage medium The stored data are then organized for efficient access. The organization can be performed by any one of the processors $205_1$ through $205_M$.

Figure 3:
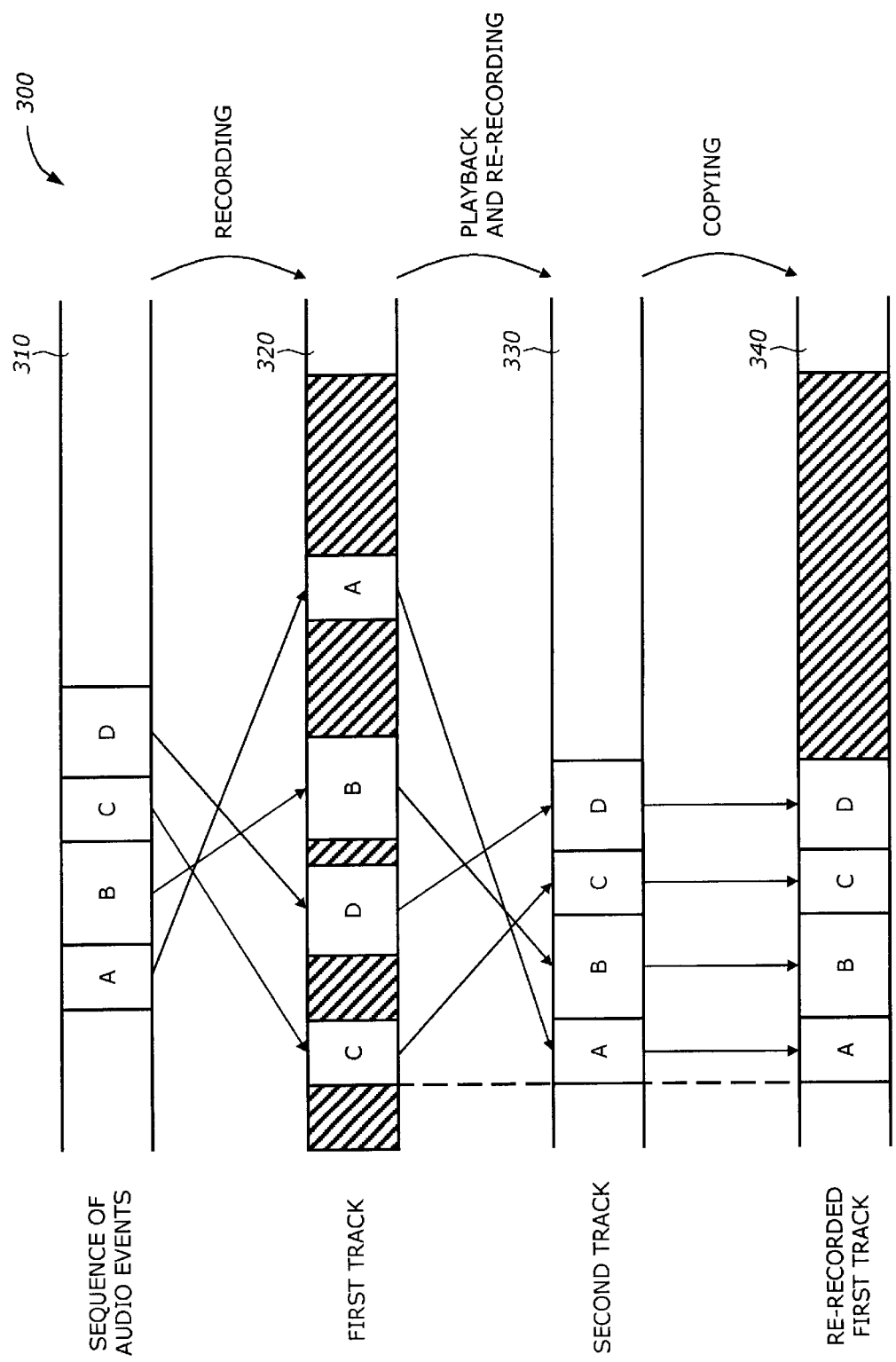
FIG. 3 is a diagram illustrating a process of dense edit via re-recording according to one embodiment of the present invention.

FIG. 3 is a diagram illustrating a process of dense edit via re-recording according to one embodiment of the present invention. The organization involves a sequence of events 310, a first track 320, a second track 330, and a re-recorded first track 340.

The sequence of recording events 310 includes a number of recording events. Each recording event corresponds to an audio segment. The length of the audio segments helps to determine if data re-organization or dense editing is necessary. If the lengths of the segments are too short, disk fragmentation is likely to result and data re-organization is necessary. In one embodiment, if two or more segments are less than one second in length, and have less than one second of silence between them, then they will be combined or re-organized because scattered events are likely to occur. If the lengths are sufficiently long, no data re-organization or combining is necessary. In one embodiment, a segment length of one second or above is considered sufficiently long and therefore is not marked for re-organization or combining. To keep track of this information, a linked list is created and information about the audio segments is stored in this linked list for later determination. The linked list will be described later.

In this illustrative example, the sequence 310 includes four small events A, B, C, and D of different sizes. During recording, these events are written onto the first track 320. Due to disk allocation, the audio events A, B, C, and D are scattered on the first track 320. A linked list keeps information about the audio events A, B, C, and D including the sizes of the events. From the linked list, it is determined that the audio events A, B, C, and D are small and scattered and need to be merged or combined into a large event. Using the information from the linked list, a second track 330 is allocated.

The audio events A, B, C, and D are then played back and re-recorded onto the second track 330. During the re-recording, the audio events are re-organized and merged into a contiguous sequence of events to restore the same sequence as in the original sequence 310. After re-recording, the contiguous event on the second track 330 is copied onto the first track 340. The first track 340 now contains the contiguous sequence of audio events A, B, C, and D.

Figure 4:
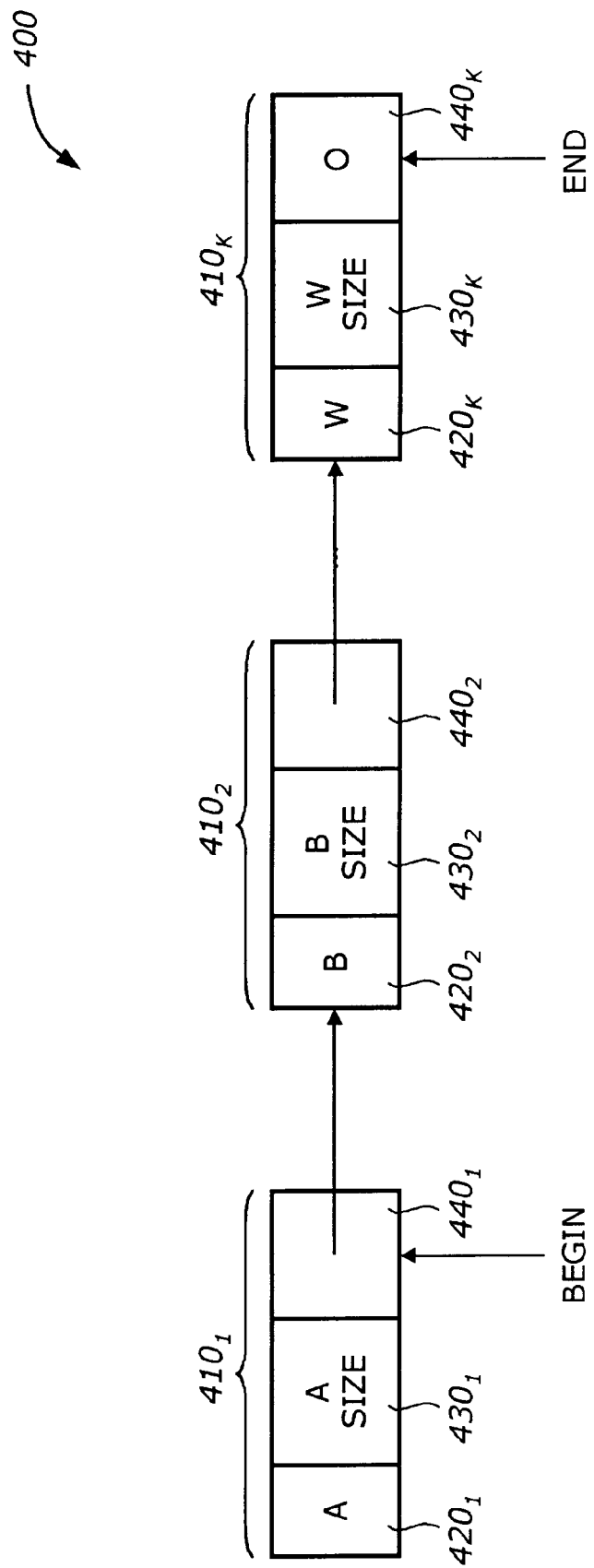
FIG. 4 is a diagram illustrating a linked list used in the re-recording according to one embodiment of the present invention.

FIG. 4 is a diagram illustrating a linked list used in the re-recording according to one embodiment of the present invention. The linked list 400 includes K elements $410_1$ through $410_K$. The K elements $410_1$ through $410_K$ represent the data structure that store information on the audio segments 1 through K.

Element $410_1$ has at least three fields: field $420_1$ is the label A which is the label of the audio data segment A, field $430_1$ is the size of the audio data segment A, and field $440_1$ is the link field that points to the next element, element $410_2$. Additional fields may be included as attributes to the corresponding audio segments such as type (e.g., sound, silence).

Similarly, elements $410_2$ through $410_K$ have at least three fields: fields $420_2$ through $420_K$ represent the labels for the corresponding audio data segments, fields $430_2$ through $430_K$ represent the sizes of the corresponding audio data segments, and fields $430_2$ through $430_K$ represent the link fields. Additional fields may be included as attributes to the corresponding audio segments such as type (e.g., sound, silence).

For element $410_K$, the link field $440_K$ is the terminating field.

The size of the audio data segment can be represented by the number of samples, the number of bytes of memory that stores the segment, or the time interval of the audio segment. The size field is one attribute that is used by the system to determine if there is disk fragmentation. Other attributes include the nature or type of the sequence of the audio segments (e.g., sound or silence).

Figure 5:
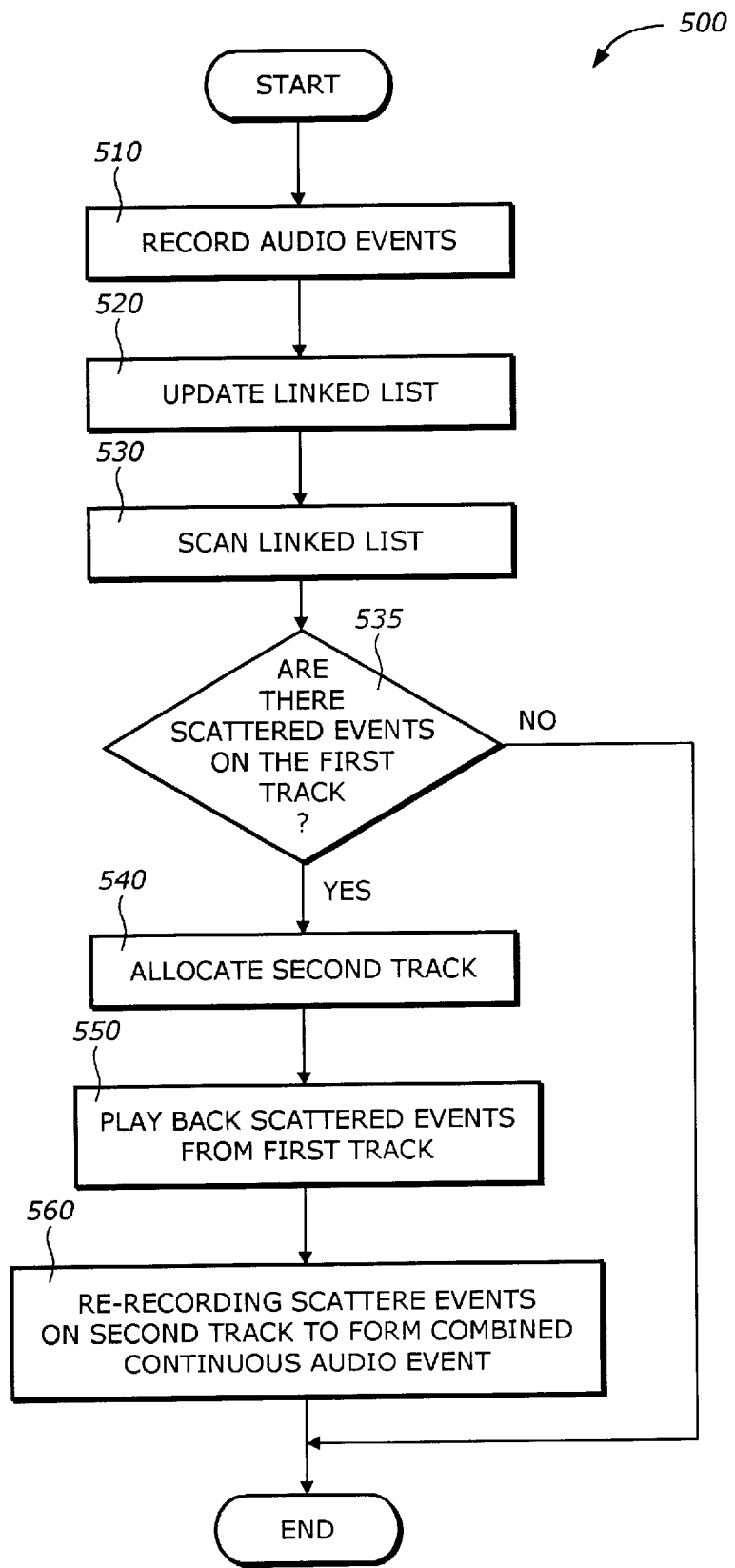
FIG. 5 is a flowchart illustrating a process for re-recording according to one embodiment of the present invention.

FIG. 5 is a flowchart illustrating a process 500 for re-recording according to one embodiment of the present invention.

At START, the process 500 records the audio events in real-time, as these events are processed by the signal processing subsystem, onto the first track in a mass storage (Block 510). The process 500 then updates the linked list (Block 520). The linked list is a data structure that contains information about the recording events. This information includes the length of the audio segments, or alternatively, the number of samples of each segment. Next the process 500 scans the linked list to examine the fields of the linked list (Block 530).

Next, the process 500 determines if there are any scattered events on the first track (Block 535). The determination is based on the contents of the linked list. For example, the size fields of the linked list may be compared with a threshold value. If the size of the recorded event is less than a predetermined value, it is inferred that the event is sufficiently small that should be merged with other events to form a combined large event. Then, the process 500 allocates a second track having sufficient available space to store the identified scattered events (Block 540).

Next, the process 500 plays back the scattered events from the first track (Block 550). Then, the process 500 re-records the played back scattered events onto the allocated second track to form a combined contiguous audio event (Block 560). Then, the process 500 is terminated.

The present invention thus provides efficient dense edit for scattered small audio events. The technique uses a linked list to identify the scattered events and re-records these identified scattered events into a combined contiguous large event. The technique reduces seek time during real-time playback and provides efficient utilization of disk space.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to re-recording audio events, the method comprising:
   determining scattered audio events on a first track based on a linked list;
   merging the scattered audio events into a combined audio event on a second track; and
   copying the combined audio event on the second track to the first track.

2. The method of claim 1 wherein the linked list comprises a plurality of elements, each element having at least a label identifying an audio segment, a size field specifying a size of the audio segment, and a pointer pointing to a next audio segment.

3. The method of claim 2 wherein determining scattered audio events comprises:
   identifying the elements of the linked list having the corresponding sizes less than a predetermined threshold.

4. The method of claim 3 wherein merging the scattered audio events comprises:
   allocating the second track based on the identified elements;
   playing back the audio events in the identified elements from the first track; and
   recording the played back audio events to the second track to form the combined audio event.

5. The method of claim 4 wherein the first and second tracks are stored on a storage medium.

6. The method of claim 5 wherein the storage medium is a hard disk.

7. A computer program product comprising:
   a computer usable medium having computer program code embodied therein to re-recording audio events, the computer program product having:
   computer readable program code for determining scattered audio events on a first track based on a linked list;
   computer readable program code for merging the scattered audio events into a combined audio event on a second track; and computer readable program code for copying the combined audio event on the second track to the first track.

8. The computer program product of claim 1 wherein the linked list comprises a plurality of elements, each element having at least a label identifying an audio segment, a size field specifying a size of the audio segment, and a pointer pointing to a next audio segment.

9. The computer program product of claim 2 wherein the computer readable program code for determining scattered audio events comprises:

computer readable program code for identifying the elements of the linked list having the corresponding sizes less than a predetermined threshold.

10. The computer program product of claim 3 wherein the computer readable program code for merging the scattered audio events comprises:

computer readable program code for allocating the second track based on the identified elements;

computer readable program code for playing back the audio events in the identified elements from the first track; and computer readable program code for recording the played back audio events to the second track to form the combined audio event.

11. The computer program product of claim 4 wherein the first and second tracks are stored on a storage medium.

12. The computer program product of claim 5 wherein the storage medium is a hard disk.

13. A system comprising:

a processor;

a memory coupled to the processor to store program code to re-record audio events, the program code, when executed, causing the processor to:

determine scattered audio events on a first track based on a linked list, merge the scattered audio events into a combined audio event on a second track, and copy the combined audio event on the second track to the first track.

14. The system of claim 13 wherein the linked list comprises a plurality of elements, each element having at least a label identifying an audio segment, a size field specifying a size of the audio segment, and a pointer pointing to a next audio segment.

15. The system of claim 14 wherein the program code causing the processor to determine scattered audio events causes the processor to identify the elements of the linked list having the corresponding sizes less than a predetermined threshold.

16. The system of claim 15 wherein the program code causing the processor to merge the scattered audio events causes the processor to allocate the second track based on the identified elements, play back the audio events in the identified elements from the first track by a player, and record the played back audio events to the second track to form the combined audio event by a recorder.

17. The system of claim 16 wherein the first and second tracks are stored on a storage medium.

18. The system of claim 17 wherein the storage medium is a hard disk.

* * * * *